(12) United States Patent
Hüdepohl

(10) Patent No.: US 11,583,880 B2
(45) Date of Patent: Feb. 21, 2023

(54) DEVICE FOR DISTRIBUTING BULK MATERIAL WITH A DEVICE FOR BLOCKING DETECTION

(71) Applicant: HUGO VOGELSANG MASCHINENBAU GMBH, Essen (DE)

(72) Inventor: Nadja Hüdepohl, Löningen (DE)

(73) Assignee: HUGO VOGELSANG MASCHINENBAU GMBH, Essen (DE)

( * ) Notice: Subject to any disclaimer, the term of this patent is extended or adjusted under 35 U.S.C. 154(b) by 642 days.

(21) Appl. No.: 16/656,638

(22) Filed: Oct. 18, 2019

(65) Prior Publication Data
US 2020/0130003 A1 Apr. 30, 2020

(30) Foreign Application Priority Data
Oct. 19, 2018 (DE) .......................... 102018126118.7

(51) Int. Cl.
*B05B 12/00* (2018.01)
*A01C 7/08* (2006.01)
(Continued)

(52) U.S. Cl.
CPC ............ *B05B 12/004* (2013.01); *A01C 7/082* (2013.01); *A01C 7/105* (2013.01); *A01C 7/206* (2013.01);
(Continued)

(58) Field of Classification Search
CPC ...... G01F 1/3266; G01F 1/3259; G01F 1/325; G01F 1/32; G01F 1/20; G01F 1/05; G01F 1/00; G01F 1/66; A01C 7/082; A01C 7/084; A01C 7/105; A01C 7/206; A01C 7/081; A01C 7/08; A01C 7/00; A01C 7/102; A01C 7/10; A01C 7/20; B05B 12/004; B05B 12/00
See application file for complete search history.

(56) References Cited

U.S. PATENT DOCUMENTS 5,740,746 A 4/1998 Ledermann et al.
6,079,340 A 6/2000 Flamme et al.
(Continued)

FOREIGN PATENT DOCUMENTS

CN 102630411 8/2012
DE 277766 4/1990
(Continued)

*Primary Examiner* — Christopher J. Novosad
(74) *Attorney, Agent, or Firm* — Price Heneveld LLP

(57) ABSTRACT

A device for distributing bulk material, such as seed material, includes a flow path having at least one conduit for conveying the bulk material from a bulk material source towards an agricultural area, and a blockage detection device in the flow path. The blockage detection device includes at least one sensor, which is mounted to the outside of the line and is configured to register mechanical vibrations of the line, as well as an evaluation unit in signal communication with the sensor, which is configured to detect a blockage as a function of the registered mechanical vibration. A method for detecting a blockage includes a sensor that identifies blockage as a function of the detected mechanical vibration.

18 Claims, 3 Drawing Sheets

(51) Int. Cl.
 - *A01C 7/20* (2006.01)
 - *A01C 21/00* (2006.01)
 - *A01C 7/10* (2006.01)
 - *G01F 1/325* (2022.01)
 - *G01F 1/66* (2022.01)

(52) U.S. Cl.
 CPC ............ *A01C 21/00* (2013.01); *G01F 1/3266* (2022.01); *G01F 1/66* (2013.01); *A01C 7/084* (2013.01)

(56) References Cited

U.S. PATENT DOCUMENTS

| | | | |
|---|---|---|---|
| 6,489,784 B2 | 12/2002 | Adams et al. | |
| 2014/0332514 A1 * | 11/2014 | Holverson | ............ B23K 9/0282 219/130.21 |

FOREIGN PATENT DOCUMENTS

| | | | |
|---|---|---|---|
| DE | 19946410 A1 | 4/2001 | |
| DE | 102013012845 A1 | 2/2015 | |
| EP | 0883983 | 12/1998 | |
| EP | 1341122 A1 * | 9/2003 | ............. A01C 7/105 |
| EP | 3014968 A1 * | 5/2016 | ............. A01C 7/105 |
| EP | 3153825 A1 | 4/2017 | |
| WO | 2011054340 | 5/2011 | |
| WO | 2012125575 A1 | 9/2012 | |
| WO | WO-2015028326 A1 * | 3/2015 | ........... A01C 23/003 |

* cited by examiner

DEVICE FOR DISTRIBUTING BULK MATERIAL WITH A DEVICE FOR BLOCKING DETECTION

CROSS-REFERENCE TO FOREIGN PRIORITY APPLICATION

The present application claims the benefit under 35 U.S.C. §§ 119(b), 119(e), 120, and/or 365(c) German Application No. 102018126118.7 filed Oct. 19, 2018.

FIELD OF THE INVENTION

The present invention relates to a device for distributing bulk material, in particular, seed material, on agricultural areas, with a bulk material source for the provision of bulk material, with a flow path that is connected to the bulk material source, wherein the flow path comprises at least one line to convey the bulk material from the bulk material source towards the agricultural area, and a blockage detection device for detecting a blockage in the at least one line.

BACKGROUND OF THE INVENTION

Devices of the aforementioned type distribute bulk material to a predetermined working area. Preferably, these devices have several lines on their downstream end, each of which comprises a connection section for coupling with an output device, wherein the output device is configured, in particular, to transport the bulk material in the direction of the agricultural area. Such devices are known, in particular, in seed drilling and are widespread. Devices for distributing seed material are known for example from U.S. Pat. No. 5,740,746 or 6,079,340.

For example, dispensing nozzles, injection systems, or even the output from the free outlet of the hoses, the so-called drag hose operation, are used as output devices.

In the known distribution devices, partial or complete blockages in the flow path can also occur due to the long line lengths. For equipment whose output devices engage the soil, such blockages can also occur in the area of the output devices, for example, in reverse drive or due to specific soil compositions. If such blockages are not recognized, this leads to entire rows of an agricultural area along which the distribution devices provided on vehicles for that purpose are driven, not being supplied with bulk material, in particular, seed material. Likewise, an undetected blockage can also lead to excessive dispensing of the bulk material in other areas and thus lead to oversaturation of the agricultural areas. Both lead to crop yield losses in agricultural operation, which should be avoided at all costs. Blockages in the flow path should therefore be recorded immediately without a significant delay in the flow of seed, so that operation can immediately be halted for resolving the blockage.

In view of the fact that in the industry, agricultural areas and distribution units continue to grow in size and the number of bulk material outlets with corresponding lines and output devices continues to increase, it is becoming increasingly difficult for individual users to detect blockages in these flow paths themselves, so that the risk of loss of crop yield increases.

So far, such blockages are identified with devices for blockage detection which extend into the flow path or are arranged within the flow path and in this way record measurements, particularly acoustic signals of the flowing mixed fluid. Corresponding devices are known from WO 2012/125575 A1 and U.S. Pat. No. 6,489,784 B2. Furthermore, there are known sensors, which detect acoustic signals that are generated by way of having a sound body extend into the flow path, wherein the bulk material impacts the sound body. However, the arrangement of the respective sensors within the flow path presents an increased risk of blockage of the flow path. In addition, the sound bodies in the flow path are only impacted by a fraction of the flowing bulk material, so that these procedures are only partially oriented to the detection of a blockage. It was thus an object of the invention to suggest an improvement of the distribution devices of the type indicated at the beginning, which minimizes the risk of yield loss in operation by detecting blockage of the flow path faster.

SUMMARY OF THE INVENTION

The invention achieves the object with devices of the initially mentioned type with a device for detecting a blockage having at least one sensor that is mounted on the outside of the line and is configured to register mechanical vibrations of the line, as well as an evaluation unit in signal communication with the sensor and configured to identify a blockage as a function of the detected mechanical vibration. The invention makes use of the realization that the way of detecting a blockage in the flow path through the mechanical vibrations caused by the flowing bulk material is extremely reliable. The registering of this vibration is furthermore carried out by a sensor that is not arranged invasively in the flow path, but instead on the outside of the line of the flow path, such that at any rate, the sensor itself does not promote formation of blockages of the line. A particular advantage of the invention is that fluctuations in the operating conditions, such as a change in the pressure, temperature, or volume flow of the bulk material, do not lead to impairment of the sensor. The sensor is, therefore, able to register the volume flow in the flow path without being affected or damaged by it. The invention makes use of the realization that in order to minimize the risk of yield loss, it is paramount to identify the blockage, whereas identifying a flow rate reduction or an immediate localization of the blockage are not necessarily key. Accordingly, according to invention, the sensors register the mechanical vibration of the line preferably exclusively for identifying a blockage, and not for comparison with measurands in other lines. This leads to a significantly faster detection of a blockage in a line of the flow path.

The signal communication between the sensor and the evaluation unit can both be done by wireless and wired data transmission.

Preferably, the mechanical vibration is characterized by the parameters of frequency and/or amplitude. The mechanical vibration caused by the flowing bulk material is thus characterized in its intensity and with regard to the frequency of the impacts of the bulk material. The amplitude is preferably characterized by the chronological progression of the frequency and/or amplitude.

In addition, the sensor and/or the evaluation unit preferably comprise a signal transducer which is configured to convert the detected mechanical vibration, in particular, the amplitude and/or frequency, into an electrical signal. The electrical signal is provided in the form of a voltage, a current, or a capacity. The conversion of the detected mechanical vibration into an electrical signal according to the invention allows a rapid further processing of the signal.

Further preferably, the evaluation unit is configured to compare the vibration with a threshold value and to identify a blockage in the event of an unacceptable deviation from the threshold value, i.e., depending on the definition, in particular, undershooting or exceeding the threshold value. Such an "impermissibility" threshold value may be provided as a predefined threshold value or as a function of the detected vibrations.

In the case of a predefined threshold value, the latter is preferably stored in a memory that is integrated in the evaluation unit or is a separate memory, and may be supplied to the evaluation unit by means of an interface. By reading the amplitude and frequency, or the respective converted electrical signal, and comparing it to the threshold value, a blockage of the flow path is immediately detected, so that operation may be halted and yield loss can be mitigated or avoided.

In the case of a threshold value being provided as a function of the detected vibrations, one may adapt flexibly to varying environmental conditions. The threshold value itself is then derived from the detected vibrations, so that, for example, a maximum change in the amplitude of two consecutive vibrations is provided as a threshold value.

In a preferred further embodiment of the invention, the flow path comprises a manifold head in communication with the line, which comprises a plurality of bulk material outlets, wherein the bulk material outlets are each connected to the manifold head by way of a respective branch line of the flow path. Due to the plurality of bulk material outlets, the invention suggests a device for distributing bulk material which conveys bulk material to the bulk material outlets through a plurality of branch lines of the flow path, and thus the spreading of the bulk material onto the agricultural surface takes place uniformly across a large working area.

Preferred arrangements of the sensors are described hereinafter. These embodiments can be combined in such a way that several sensors can also be arranged at different locations of the device. In detail:

The flow path preferably comprises at least one feed line, and at least one first sensor is arranged upstream of the manifold head in the area of the feed line. The invention makes use of the realization that identifying a blockage already in the vicinity of the feed line facilitates the subsequent localization of the blockage in the entire flow path. If there is an insufficient bulk material transport already in the feed line, this affects the entire upstream flow path, including the manifold head and the branch lines.

In a further preferred embodiment, the flow path has at least one line bend, and the at least one first sensor is positioned upstream of the manifold head in the area of the line bend. Due to the curvature of the pipe bend, the bulk material advantageously contacts the inner wall of the line due to the direction of flow, even at low flow rates, and thus produces a gaugeable mechanical vibration. According to the invention, an arrangement of the sensor is provided in which the sensor can reliably register a mechanical vibration to detect blockages.

In another preferred embodiment, the flow path comprises at least one corrugated pipe and at least one first sensor is positioned upstream of the manifold head in the area of the corrugated pipe. According to the invention, the arrangement of the sensor is provided in an area in which mechanical vibrations resulting from the impacts of bulk material against the inside of the corrugated pipe are reliably registered because of the corrugated design of the pipe.

In another preferred embodiment, the at least one first sensor is arranged on the inlet side of the manifold head. The arrangement of the sensor provides that gaugeable mechanical vibrations are determined reliably and without delay by the bulk material impacting the distribution head before the bulk material reaches the branch lines, in which a blockage has to be detected individually.

The invention is advantageously furthered in that the sensor is a first sensor, and the device for blocking detection further comprises at least one second sensor which is positioned spaced apart from the first sensor in the manifold head on its outlet side or in one of the branch lines.

Thus, a blockage is detected reliably and without a delay in time upstream of the manifold head, and additionally a potential blockage at a spaced-apart second position is detected by the second sensor, which is preferably arranged on the outlet side in the manifold head or the individual branch lines.

In an advantageous embodiment of the invention, the second sensor is configured to register a thermo-anemometric measurand.

Preferably, the at least one first sensor is arranged upstream of the manifold head at one of the above-described positions of the flow path and configured to register a mechanical vibration of the conduit, and furthermore the at least one second sensor is arranged in the manifold head on its outlet side or in the outlet channels, and particularly preferred, one second sensor is disposed in each of the branch lines. The second sensor is configured to register a thermo-anemometric measurand. By detecting a blockage in individual branch lines of the flow path, the maintenance and repair effort can be minimized due to the rapid localization of the blockage. Since the mass flow in the branch lines is reduced by the branching-off, a delayed detection of the blockage leads to a relatively low damage when compared with a blockage of the feed line of the flow path. Thus, a measurand for detecting a blockage may be registered in the area of the manifold head with a lower-cost sensor with reduced precision or speed.

The at least one second sensor, which is preferably a thermo-anemometric sensor, has a conductor to which a voltage may be applied and which is connected in a heat conductive manner to the flow path.

The conductor comprises a flow resistance which changes as a function of the temperature, particularly increases with increasing temperature. Preferably, the flow resistance is a PTC resistance element which is also used for limiting the current flowing through electronic components, in particular, for short-circuit protection. The resistance value of the flow resistance is ca. 100 ohms at 20° C. At approx. 60° C., the flow resistance reaches a stable operating point, i.e., the resistance is so large that the temperature remains at 60° C. If more energy is dissipated to the passing material, the resistance is reduced and more electrical energy is supplied to the system such as to maintain the operating point at 60° C. It is preferably this current (approx. 20 milliamperes at 12 Volts) which is evaluated.

The functioning principle of the sensor thus designed is essentially the following: A blockage upstream of the manifold head leads to a disturbance or change of the flow. The quantitative and qualitative flow formation is thus influenced. Depending on the severity of the blockage, the speed and phase composition of the flow changes. The conductor in the flow path is heated due to the applied voltage. Because the conductor is further thermally in contact with the medium in the flow path, a heat transfer takes place due to a temperature difference between the bulk material and the conductor. The flow resistance of the conductor changes as a function of the heat transfer between the conductor and the fluid. When flow conditions in the flow path are substantially constant, there is an equilibrium state with regard to the current measured, resistance in and temperature of the conductor. However, if the heat transfers between the conductor and the flow path changes due to a change in the flow rate, phase composition, and other symptoms that occur when the flow path is blocked, this equilibrium state changes towards a different intensity of current because the resistance of the conductor changes.

In a particularly preferred embodiment of the invention, the at least one second sensor comprises a thermally conductive measuring cap. Preferably, the measuring cap is configured to isolate the second sensor mechanically from the flow path.

The material of the measuring cap and/or the second sensor is preferably selected so that its heat transfer coefficient for the medium heat is exchanged with is as high as possible. To do this, the material of the measuring cap must have as high a thermal conductivity as possible. Additional requirements are mechanical (abrasion) and chemical (corrosion) resistance against the conveying material used, as well as good workability and justifiable costs. In this case, for example, brass has shown itself to be advantageous since it meets these partially competing requirements.

Mechanical insulation is particularly understood to mean that the sensor element is protected from mechanical damage due to particles in the conveyed material.

Preferably, a heat transfer paste is arranged between the measuring cap and the second sensor and a thermally conductive connection is provided between the second sensor and the flow path. In a preferred alternative embodiment, a measuring window is provided in the measuring cap, inside of which the second sensor is arranged so that the second sensor can directly contact the conveying material. In this case, the measuring cap does not completely isolate the second sensor from the flow path, but at least forms a mechanical support body which stabilizes the second sensor.

The invention is furthered advantageously in that the first sensor comprises at least one piezo element, in particular, a resistive and/or a capacitive piezo element. The invention makes use of the realization that the piezo element registers already the smallest of mechanical vibrations which cause deformation of the piezo element, respectively cause a distance variation of the capacitor plates of a capacitive piezo element, and preferably generates an electrical signal therefrom. Piezo elements only require a small space and also offer the advantage that they can detect even the smallest mechanical vibrations.

The invention makes use of the realization that by attaching a piezo element on the outside of the flow path, the risk of premature failure of the high-resistance piezo element resulting from high voltage fields in the environment, in particular, caused by collisions of seeds, dust, fertilizers, and other bulk materials, is minimized.

In another preferred embodiment of the invention, the first sensor comprises a MEMS system, also known as microelectromechanical systems, in particular, a capacitive MEMS system, which is arranged spaced-apart from the flow path. The invention makes use of the realization that a MEMS system, which operates like an acceleration sensor according to the mass-spring principle, provides for the detection, processing, and storage of electrical signals registered on the basis of the mechanical vibrations of the line using a very low installation space. Due to the low installation space requirement of the MEMS system, these can be integrated flexibly into minimally-invasive systems.

MEMS systems are tiny components, in particular, smaller than one micrometer large, which combine logic elements and micromechanical structures on a chip. These components process mechanical and electrical information and can be designed as a sensor, actuator, oscillator, or filter.

In another preferred further embodiment of the invention, the piezo element according to the invention comprises a piezo-ceramic disk and/or a form-flexible piezo-electric polymer film, and/or a piezo-ceramic cable. Due to the simple design, a piezo-ceramic disc offers a first variant of a piezo element that can be produced profitably. A form-flexible electrical polymer film is advantageous with regard to its installation on the line of the flow path and the form-flexible adaptation to the outer geometry, and a piezo ceramic cable is also advantageous with regard to the attachment to a curved, or corrugated tube.

The invention is advantageously furthered in that the first sensor is coupled with a magnetic mount, which mount is attached to a line of the flow path. The sensor thus may advantageously be coupled to the magnetic mount and may be detached therefrom for maintenance purposes.

In an alternative embodiment of the invention, the first sensor is coupled to a pipe clamp, which clamp is attached to a line of the flow path. According to this embodiment of the invention, the sensor may therefore be coupled to a pipe clamp and may also be detached therefrom and thus from the line of the flow path again for maintenance and repair purposes.

In another preferred further embodiment of the invention, the electronic evaluation unit is configured to detect a blockage in the lines and/or individual branch lines, as a function of the registered mechanical vibration of the at least one first sensor and a further measurand of the at least one second sensor. According to the invention, an embodiment is suggested which provides for the detection of blockages in targeted areas of the flow path and thus facilitates subsequent maintenance of the device to resolve the blockage.

The invention further achieves the underlying object by providing a method for distributing bulk material, especially seed material, on agricultural areas, by providing bulk material, conveying the bulk material through a flow path towards the agricultural area, wherein the bulk material is supported by transported through at least one line of the flow path, registering a mechanical vibration of the line with a sensor mounted to the outside of the line, and identifying a blockage in a line of the flow path as a function of the registered mechanical vibration.

The method is advantageously furthered by detecting a thermo-anemometric measurand using a second sensor, and detecting a blockage in the individual branch lines of the flow path, as a function of the recorded thermo-anemometric measurand.

The method is advantageously furthered by converting the registered mechanical vibration, in particular, the amplitude and/or the frequency, into an electrical signal.

Furthermore, the method is advantageously furthered by comparing the vibration, in particular, the amplitude and/or the frequency of the registered mechanical vibration, with a threshold value and the detection of a blockage in the event of an unacceptable deviation from the threshold value.

In addition, the method is advantageously furthered by detecting a mechanical vibration using several discrete and spaced-apart sensors of the same flow path and detecting a blockage in a line or in individual branch lines of the flow path.

BRIEF DESCRIPTION OF THE DRAWINGS

The invention is described in more detail below with reference to the attached figures using a preferred exemplary embodiment. Herein.

DETAILED DESCRIPTION OF THE EMBODIMENTS

Figure 1:
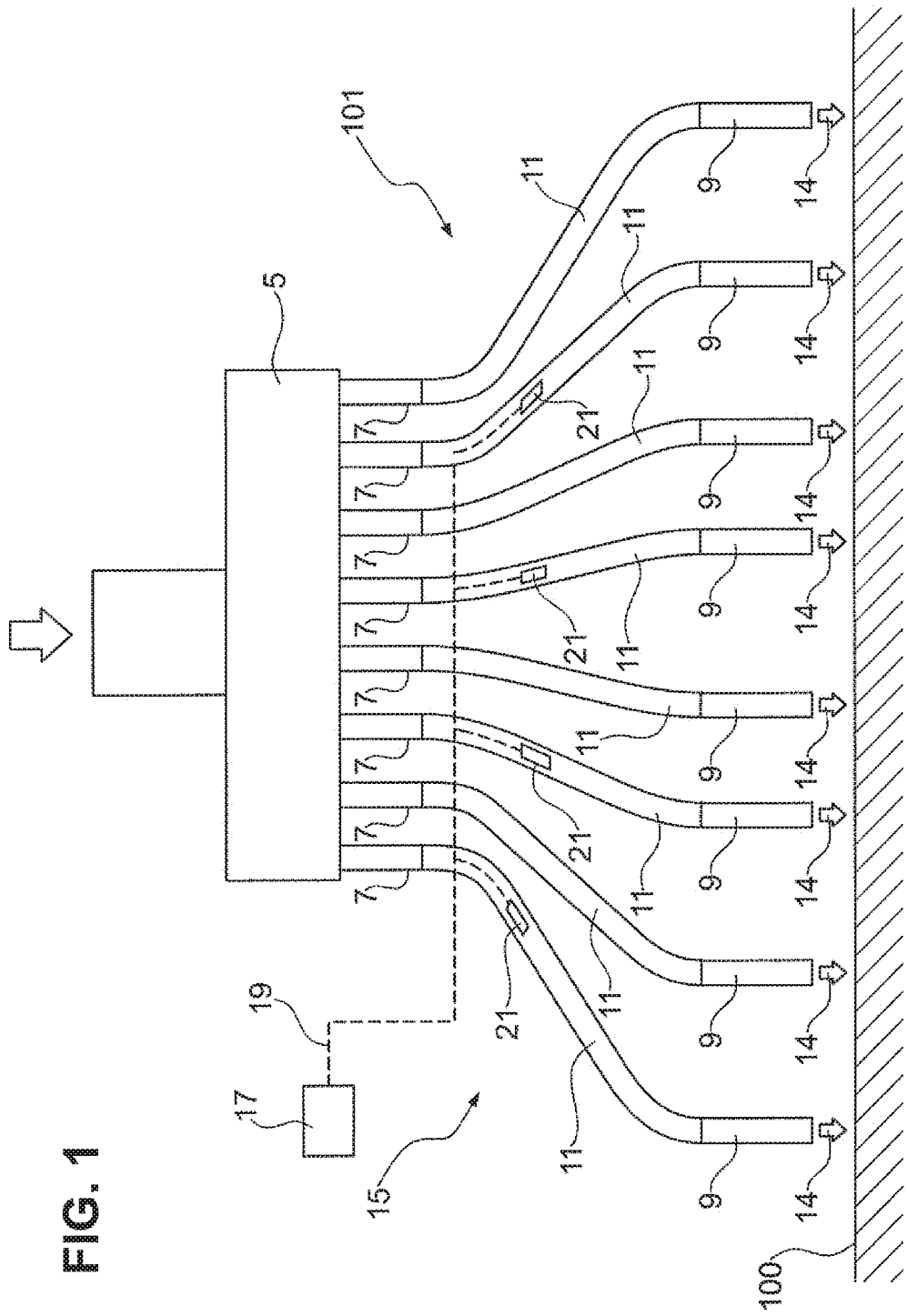
FIG. 1 is a distribution device according to the invention according to a preferred exemplary embodiment with output devices connected thereto, FIG. 2 are various preferred installation scenarios of a sensor or several sensors in the flow path of the distribution device of FIG. 1 according to the preferred exemplary embodiment.

FIG. 1 shows a schematic representation of a distribution device 101 according to the invention according to a preferred exemplary embodiment. The distribution device 101 shown in FIG. 1 comprises a manifold head 5. The manifold head 5 has a bulk material input 3 for connecting to a bulk source. The manifold head 5 may be a known manifold head and comprise means for dosing and evenly distributing the supplied bulk material to a majority of bulk material outlets 7.

A number of one or more output devices 9 is connected to the device 101. The output units 9 are each connected to the bulk material outlets 7 by means of a branch line 11 of the flow path. Through the outlets 7 and lines 11, flow paths are defined from the manifold head 5 to the output units 9.

The output devices 9 are configured to dispense the conveyed bulk material in the direction of arrows 14 onto an agricultural area 100 in a generally known manner. This requires that the corresponding bulk material is first supplied to the device 101.

The device 101 according to FIG. 1 furthermore comprises a blockage detection device 15.

Blockage detection device 15 comprises an evaluation unit 17 and at least one first sensor 21. The first sensor 21 is connected to the evaluation unit 17. Depending on whether the first sensor 21 has a separate signal converter or not, the lines 19 may be a power or data lines. The one or more sensors 21 is/are respectively mounted to the outside of a line of the flow path and is/are designed to detect a mechanical vibration as a function of the material flow in the flow path. The electronic evaluation unit 17 is configured to compare the signal registered by the sensors 21 with a threshold value and to detect a blockage.

Figure 2:
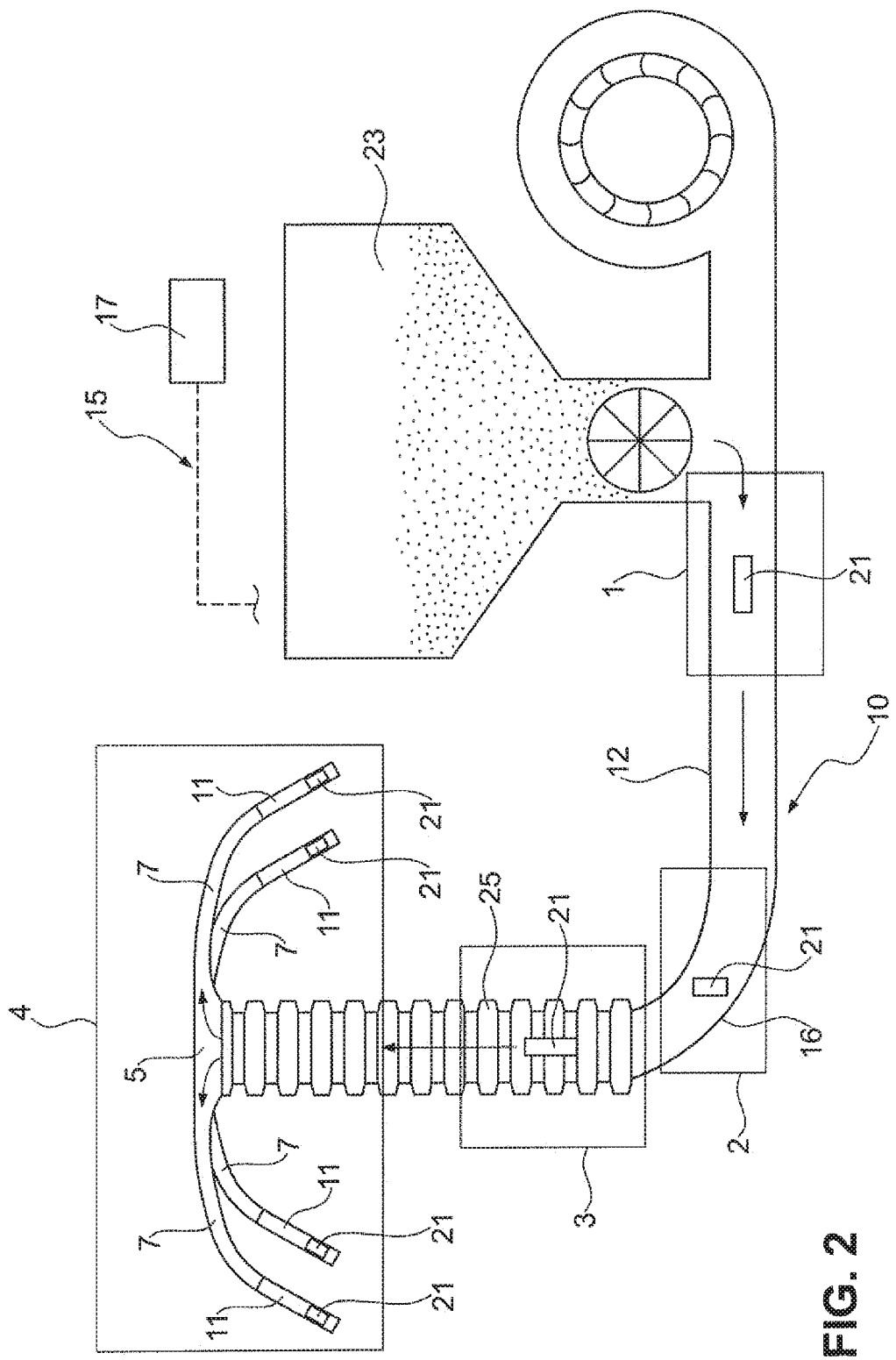

FIG. 2 schematically shows different preferred installation scenarios of the first sensor 21 in the flow path of the distribution device 101 from FIG. 1. The section of the device 101 shown in FIG. 2 comprises a manifold head 5 which is connected to the line 12 of the flow path 10 for connection to the bulk material source 23. The manifold head 5 comprises a plurality of bulk material outlets 7 for dosing and evenly distributing the supplied bulk material.

The manifold head 5 furthermore comprises a plurality of branch lines 11 connected to the bulk material outlets.

The bulk material source 23 is connected to the flow path 10, in particular, the bulk material line 12, and configured to supply a bulk material. The flow path 10 also comprises a pipe bend 16 connected to the line 12 and a corrugated pipe 25 adjacently connected to the pipe bend 16. The corrugated pipe 25 opens into the manifold head 5.

The distribution device 101 furthermore comprises a blockage detection device 15.

The blockage detection device 15 comprises an evaluation unit 17 and at least one first sensor 21a, 21b, 21c, 21d. The first sensors 21a, 21b, 21c, 21d are in signal communication with the evaluation unit 17. Depending on whether the sensors 21a, 21b, 21c, 21d have their own signal converter or not, the lines 19 may be power or data lines. The sensors 21a, 21b, 21c, 21d are mounted to the outside of a line of the flow path 10 and are configured to detect a mechanical vibration as a function of the flow path. The electronic evaluation unit 17 is configured to compare the signal registered by the first sensors 21a, 21b, 21c, 21d with a threshold value and to detect a blockage.

The first sensors 21a 21b, 21c, 21d can each be mounted in one or more positions of the flow path 1, 2, 3, and 4. In addition, at least one second sensor 22 is arranged preferably at position 4.

Position 1 of the flow path 10 is defined by the area of line 12, which is connected with the bulk material source 23. The sensor 21a is mounted on the outside at the line 12 of the flow path 10 and designed to detect a mechanical vibration dependent on the flow of material in line 12.

Position 2 of the flow path 10 is defined by the area of the pipe bend 16, which is connected to the line 12 of the flow path 10. The sensor 21b is mounted on the outside at the pipe bend 16 and configured to detect a mechanical vibration as a function of the flow of material in the pipe bend 16.

Position 3 of the flow path 10 is defined by the area of the corrugated pipe 25, which is connected to the line bend 16 of the flow path 10. The sensor 21c is mounted on the outside on the corrugated pipe 25 and designed to detect a mechanical vibration dependent on the conveying flow in the corrugated pipe 25.

Position 4 of the flow path 10 is defined by the area of the manifold head 5, which is connected to the corrugated pipe 25. The bulk material outlets 7 connected with the manifold head 5 are each connected with a branch line 11. The first sensor 21d and/or at least one second sensor 22 is mounted on the outlet side in accordance with position 4, and configured to detect a mechanical vibration as a function of the flow of material in the branch lines 11.

Figure 3:
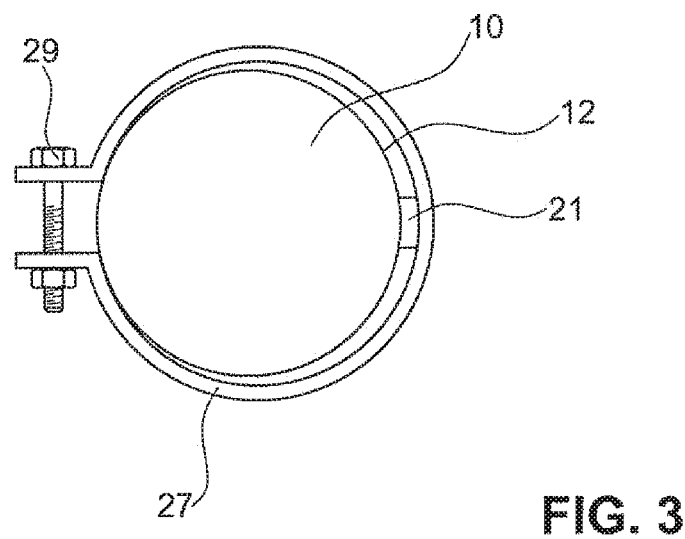
FIG. 3 is a preferred embodiment of the installation of the first sensor on the line of the flow path.

FIG. 3 shows the line 12 of the flow path 10 on the outside of which the first sensor 21 is mounted. The sensor 21 is coupled to a pipe clamp 27, which comprises a closure means 29. The pipe clamp 27 is configured to attach the sensor outside to the line 12 when in the closed state.

Figure 4:
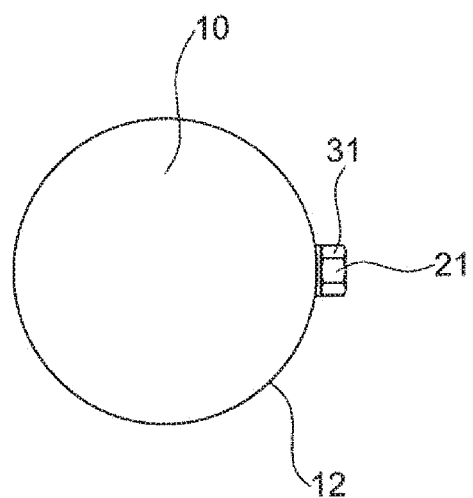
FIG. 4 is an alternative embodiment of the installation of the first sensor on the line of the flow path.

FIG. 4 shows the line 12 of the flow path 10 on which the first sensor 21 is mounted on the outside. The sensor 21 is coupled with a magnetic mount 31. The magnetic mount 31 is coupled with the line 12 of the flow path 10 and mounted to the sensor 21 outside on the line 12.

The invention claimed is:

1. A device for distributing bulk material to an agricultural area comprising:
    a bulk material source for the provision of bulk material;
    a flow path in communication with the bulk material source, wherein the flow path comprises at least one line for conveying the bulk material from the bulk material source towards the agricultural area;
    a blockage detection device in the at least one line of the flow path, wherein the blockage detection device comprises at least one sensor mounted to the outside of the at least one line of the flow path configured to detect a mechanical vibration of the at least one line of the flow path; and
    an evaluation unit in signal communication with the at least one sensor configured to identify a blockage of the at least one line of the flow path as a function of the detected mechanical vibration;

wherein the flow path further comprises a manifold head in communication with a plurality of lines for conveying the bulk material, the at least one sensor is a first sensor, and the blockage detection device further comprises a second sensor arranged proximate the manifold head on an outlet side thereof or a respective one of the plurality of lines; and wherein the second sensor is configured to detect a thermo-anemometric measurand.

2. The device according to claim 1, wherein the mechanical vibration further comprises a frequency and/or an amplitude.

3. The device according to claim 1, wherein the at least one sensor or the evaluation unit further comprises a signal transducer configured to convert an amplitude and/or a frequency of the detected mechanical vibration into an electrical signal.

4. The device according to claim 1, wherein the evaluation unit is configured to compare the detected mechanical vibration with a threshold value and, upon an unacceptable deviation from the threshold value, to identify the blockage.

5. The device according to claim 4, wherein the flow path further comprises a manifold head and at least one line bend and wherein the at least one sensor is arranged upstream of the manifold head in the area of the at least one line bend.

6. The device according to claim 1, wherein the flow path further comprises a manifold head having a plurality of bulk material outlets in communication with a plurality of lines of the flow path for conveying the bulk material, and wherein the bulk material outlets are each connected to the manifold head by way of a respective one of the plurality of lines of the flow path.

7. The device according to claim 1, wherein the flow path further comprises a manifold head in communication with at least one feed line and wherein the at least one sensor is arranged upstream of the manifold head in the area of the at least one feed line.

8. The device according to claim 1, wherein the flow path further comprises a manifold head and at least one corrugated pipe and wherein the at least one sensor is arranged upstream of the manifold head in the area of the at least one corrugated pipe.

9. The device according to claim 1, wherein the flow path further comprises a manifold head and wherein the at least one sensor is arranged on the inlet side of the manifold head.

10. The device according to claim 1, wherein the first sensor is arranged upstream of the manifold head at one of the plurality of lines for conveying the bulk material through the flow path; and the second sensor is arranged in the manifold head on the outlet side thereof or in a respective one of the plurality of lines.

11. The device according to claim 1, wherein the first sensor comprises at least one resistive and/or a capacitive piezo element.

12. The device according to claim 11, wherein the piezo element comprises at least one of a piezo ceramic disc, a form-flexible piezo-electric polymer film, or a piezo ceramic cable.

13. The device according to claim 1 wherein the first sensor comprises a MEMS system arranged spaced apart from the flow path.

14. The device according to claim 1, wherein the first sensor is coupled to a pipe clamp attached to the at least one line of the flow path.

15. The device according to claim 1, wherein the first sensor is coupled to a magnetic mount which is attached to the at least one line of the flow path.

16. The device according to claim 1, wherein the electronic evaluation unit is configured to detect a blockage in at least one of a plurality of lines for conveying the bulk material as a function of the mechanical vibration detected by the first sensor and a further measurand detected by at least one second sensor.

17. A method for distributing bulk material to an agricultural area comprising the steps of:
providing a bulk material;
conveying the bulk material through a flow path towards the agricultural area, wherein the bulk material is transported through at least one line of the flow path;
detecting a mechanical vibration of the line with a first sensor mounted to an outside of the at least one line of the flow path;
identifying a blockage in the at least one line of the flow path as a function of the detected mechanical vibration by the first sensor;
detecting a thermo-anemometric measurand by a second sensor; and
identifying a blockage in the at least one line of the flow path as a function of the detected thermo-anemometric measurand.

18. The method according to claim 17, wherein the at least one sensor is a first sensor and the method further comprises the steps of:
providing a second sensor; and
after the step of identifying the blockage in the at least one line of the flow path by means of the first sensor:
detecting a thermo-anemometric measurement variable by means of the second sensor arranged in a manifold head on an outlet side of the manifold head; and
identifying a blockage in a one of a plurality of individual lines of the flow path as a function of the detected thermo-anemometric measurand.

* * * * *